(12) United States Patent
Trojer et al.

(10) Patent No.: US 9,686,651 B2
(45) Date of Patent: Jun. 20, 2017

(54) DETERMINING POSITION OF A WIRELESS DEVICE USING REMOTE RADIO HEAD DEVICES

(71) Applicant: Telefonaktiebolaget L M Ericsson (publ), Stockholm (SE)

(72) Inventors: Elmar Trojer, Taby (SE); Miguel Berg, Upplands Vasby (SE); Per-Erik Eriksson, Stockholm (SE); Fredrik Gunnarsson, Linkoping (SE); Chenguang Lu, Sollentuna (SE); Jacob Osterling, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 484 days.

(21) Appl. No.: 14/360,009

(22) PCT Filed: Apr. 9, 2014

(86) PCT No.: PCT/SE2014/050436
§ 371 (c)(1),
(2) Date: May 22, 2014

(87) PCT Pub. No.: WO2015/156714
PCT Pub. Date: Oct. 15, 2015

(65) Prior Publication Data
US 2015/0296344 A1    Oct. 15, 2015

(51) Int. Cl.
*H04W 4/02* (2009.01)
*H04W 64/00* (2009.01)
*H04W 88/08* (2009.01)

(52) U.S. Cl.
CPC ........... *H04W 4/027* (2013.01); *H04W 64/00* (2013.01); *H04W 88/085* (2013.01)

(58) Field of Classification Search
CPC .... H04W 4/027; H04W 64/00; H04W 88/085
See application file for complete search history.

(56) References Cited

U.S. PATENT DOCUMENTS

| 2003/0008663 A1 | 1/2003 | Stein et al. |
| 2007/0115174 A1* | 5/2007 | Herrick ..................... G01S 3/10 342/420 |

(Continued)

FOREIGN PATENT DOCUMENTS

| EP | 1448008 A1 | 8/2004 |
| EP | 2099240 A1 | 9/2009 |
| WO | 02087275 A2 | 10/2002 |

OTHER PUBLICATIONS

"FCC Small Entity Compliance Guide, Wireless E911 Location Accuracy Requirements", Federal Communications Commission Report and Order, FCC 10-176, PS Docket No. 07-114, DA 11-920, (May 19, 2011), 3 pages.

(Continued)

*Primary Examiner* — Qun Shen
(74) *Attorney, Agent, or Firm* — NDWE LLP (57) ABSTRACT

It is presented a method for assisting the determining of a position of a wireless device, the method being performed in a network node connected to a plurality of remote radio head devices via a combiner. The method comprises the steps of: receiving an uplink signal via the combiner; comparing a carrier frequency of the uplink signal with a set of manipulation schemes for a carrier frequency of uplink signals, wherein the manipulation schemes are different for at least some of the plurality of remote radio head devices; and providing a proximity indication that the position of the wireless device is in the vicinity of a remote radio head device the frequency manipulation scheme of which best (Continued)

matches the uplink signal. A corresponding network node, computer program, and computer program product are also presented.

30 Claims, 4 Drawing Sheets

(56) References Cited

U.S. PATENT DOCUMENTS

| | | | | |
|---|---|---|---|---|
| 2011/0065450 | A1* | 3/2011 | Kazmi | G01S 5/0252 |
| | | | | 455/456.1 |
| 2012/0039320 | A1* | 2/2012 | Lemson | H03F 1/3247 |
| | | | | 370/338 |
| 2013/0051317 | A1* | 2/2013 | Ji | H04W 24/02 |
| | | | | 370/328 |
| 2013/0157683 | A1* | 6/2013 | Lymberopoulos | H04W 4/04 |
| | | | | 455/456.1 |
| 2013/0242951 | A1* | 9/2013 | Lee | H04W 56/001 |
| | | | | 370/336 |
| 2014/0176366 | A1* | 6/2014 | Fischer | H04W 64/006 |
| | | | | 342/374 |
| 2014/0212129 | A1* | 7/2014 | Huang | H04B 10/25 |
| | | | | 398/2 |

OTHER PUBLICATIONS

TS 36.104 V8.4.0 "Base Station (BS) radio transmission and reception", 3rd Generation Partnership Project, Technical Specification Group Radio Access Network, Evolved Universal Terrestrial Radio Access (E-UTRA), (Release 8), (Dec. 2008), 71 pages.

Moose, Paul H., et al., "A technique for orthogonal frequency division multiplexing frequency offset correction", *IEE Trans. Commun.*, vol. 42, No. 10, (Oct. 1994), pp. 2908-2914.

International Search Report and Written Opinion, Application No. PCT/SE2014/050436, dated Jan. 28, 2015, 9 pages.

International Preliminary Report on Patentability, Application No. PCT/SE2014/050436, dated Mar. 1, 2016, 5 pages.

3GPP TS 25.101, "3rd Generation Partnership Project; Technical Specification Group Radio Access Network; User Equipment (UE) radio transmission and reception (FDD) (Release 12)," Mar. 2014, 363 pages, Technical Specification, V12.3.0, 3GPP Organizational Partners.

* cited by examiner

DETERMINING POSITION OF A WIRELESS DEVICE USING REMOTE RADIO HEAD DEVICES

CROSS-REFERENCE TO RELATED APPLICATIONS

This application is a National stage of International Application No. PCT/SE2014/050436, filed Apr. 9, 2014, which is hereby incorporated by reference.

TECHNICAL FIELD

The invention relates to a method, network node, computer program, and computer program product for determining a position of a wireless device using remote radio head devices.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio head devices, where several remote radio head devices connected to the same radio base station share the same cell. In this way, a single radio base station can provide coverage in different parts of the building by placing the remote radio head devices appropriately. Moreover, the wireless device can move between the coverage of different remote radio head devices while staying within the same cell, thus avoiding causing handovers.

However, since only one cell is spanned by multiple remote radio head devices, the granularity of location determination is quite large. This leads to insufficient positioning accuracy in locating wireless devices, leading to issues in complying with increased accuracy of positioning requirements for emergency calls such as those specified in Enhanced-911 (E911) by FCC CSRIC (Federal Communication Commission Communication, Security, Reliability, Interoperability Council). Moreover, since the remote radio head devices are often deployed indoors, satellite based positioning such as GPS (Global Positioning System) is often unavailable.

SUMMARY

It is an object to enable better position determination of wireless devices when using a plurality of remote radio head devices.

According to a first aspect, it is presented a method for assisting the determining of a position of a wireless device, the method being performed in a network node connected to a plurality of remote radio head devices via a combiner. The method comprises the steps of: receiving an uplink signal via the combiner; comparing a carrier frequency of the uplink signal with a set of manipulation schemes for a carrier frequency of uplink signals, wherein the manipulation schemes are different for at least some of the plurality of remote radio head devices; and providing a proximity indication that the position of the wireless device is in the vicinity of a remote radio head device the frequency manipulation scheme of which best matches the uplink signal.

Using the different manipulation schemes for the remote radio head devices, a position of the wireless device can at least be determined to be close to a one or more remote radio head devices. This is a significant improvement over the prior art, and can, depending on the spacing of the remote radio head devices with different manipulation schemes, allow compliance with increased location accuracy requirements. Moreover, this method allows the location to be determined regardless whether the remote radio head devices are deployed inside a building or outside. Furthermore, the remote radio heads may already perform a frequency conversion of the signal, whereby it is relatively easy to deploy this solution.

The manipulation schemes may be different for each one of the plurality of remote radio head devices. In this way, a more accurate positioning is enabled, allowing positioning in the vicinity of a particular remote radio head device.

In the step of comparing, the manipulation schemes may comprise a different fixed frequency offset for each one of the remote radio head devices. This is a pragmatic and relatively uncomplicated solution which in many cases is sufficient. No dynamic control is then required for the manipulation scheme.

In the step of comparing, the manipulation schemes may comprise a different modulation using frequency shift keying for each one of the remote radio head devices. In this way, a greater number of different manipulation schemes can be deployed in a given frequency range.

In the step of comparing, the manipulation schemes may comprise different magnitudes of alternating frequency offsets for each one of the remote radio head devices and the comparing may comprise comparing a difference between alternating frequency offsets of the carrier frequency with the difference between the alternating offsets for each one of the remote radio head devices. By this differential processing, any clock inaccuracies in the remote radio head devices are compensated for. Even effects from Doppler shifts from movement can be reduced or even eliminated in this way.

In the step of comparing, the frequency manipulation scheme may comprise a different frequency hopping scheme for each one of the remote radio head devices.

The step of providing a proximity indication may comprise providing an indication of proximity of the wireless device to a plurality of remote radio head devices by considering contributions from of a plurality of manipulation schemes to the uplink signal. This allows an even greater accuracy of the determination of position.

The method may further comprise the step of: providing a velocity indication, indicating a velocity of the wireless device based on a frequency offset of the uplink signal compared to the manipulation scheme for the radio head device whose frequency manipulation scheme best matches the uplink signal.

In the step of comparing, the manipulation scheme may comprise different frequency manipulation for different diversity paths for each remote radio head device. This gives another dimension to use for differentiation, increasing the number of different manipulation schemes can be deployed in a given frequency range.

The method may further comprise the step of: configuring each one of the plurality of remote radio head devices with a different manipulation scheme.

The method may further comprise the step of: determining a position of the wireless device based on the proximity indication. In other words, the position determination can be determined within the network node.

According to a second aspect, it is presented a network node for assisting the determining of a position of a wireless device. The network node is connectable to a plurality of remote radio head devices via a combiner. The network node comprises: a processor; and a memory storing instructions that, when executed by the processor, causes the network node to: receive an uplink signal via the combiner; compare a carrier frequency of the uplink signal with a set of manipulation scheme for a carrier frequency of uplink signals, wherein the manipulation schemes are different for at least some of the plurality of remote radio head devices; and provide a proximity indication that the position of the wireless device is in the vicinity of a remote radio head device the frequency manipulation scheme of which best matches the uplink signal.

The instructions to compare may comprise instructions that, when executed by the processor, causes the network node to consider that the manipulation schemes are different for each one of the plurality of remote radio head devices.

The instructions to compare may comprise instructions that, when executed by the processor, causes the network node to consider manipulation schemes comprising a different fixed frequency offset for each one of the remote radio head devices.

The instructions to compare may comprise instructions that, when executed by the processor, causes the network node to consider manipulation schemes comprising a different modulation using frequency shift keying for each one of the remote radio head devices.

The instructions to compare may comprise instructions that, when executed by the processor, causes the network node to consider manipulation schemes comprising different magnitudes of alternating frequency offsets for each one of the remote radio head devices and to perform the comparing by comparing a difference between alternating frequency offsets of the carrier frequency with the difference between the alternating offsets for each one of the remote radio head devices.

The instructions to compare may comprise instructions that, when executed by the processor, causes the network node to consider manipulation schemes comprising a different frequency hopping scheme for each one of the remote radio head devices.

The instructions to provide a proximity indication may comprise instructions that, when executed by the processor, causes the network node to provide an indication of proximity of the wireless device to a plurality of remote radio head devices by considering contributions from of a plurality of manipulation schemes to the uplink signal.

The network node may further comprise instructions that, when executed by the processor, causes the network node to provide a velocity indication, indicating a velocity of the wireless device based on a frequency offset of the uplink signal compared to the manipulation scheme for the radio head device whose frequency manipulation scheme best matches the uplink signal.

The instructions to compare may comprise instructions that, when executed by the processor, causes the network node to consider manipulation schemes comprising different frequency manipulations for different diversity paths for each remote radio head device.

The network node may further comprise instructions that, when executed by the processor, causes the network node to configure each one of the plurality of remote radio head devices with a different manipulation scheme.

The network node may further comprise instructions that, when executed by the processor, causes the network node to determine a position of the wireless device based on the proximity indication.

According to a third aspect, it is presented a network node comprising: means for receiving an uplink signal via the combiner connected to a plurality of remote radio head devices; means for comparing a carrier frequency of the uplink signal with a set of manipulation scheme for a carrier frequency of uplink signals, wherein the manipulation schemes are different for at least some of the plurality of remote radio head devices; and means for providing a proximity indication that the position of the wireless device to be in the vicinity of a remote radio head device the frequency manipulation scheme of which best matches the uplink signal.

The manipulation schemes may be different for each one of the plurality of remote radio head devices.

The manipulation schemes may comprise a different fixed frequency offset for each one of the remote radio head devices.

The manipulation schemes may comprise a different modulation using frequency shift keying for each one of the remote radio head devices.

The manipulation schemes may comprise different magnitudes of alternating frequency offsets for each one of the remote radio head devices and the comparing may comprise comparing a difference between alternating frequency offsets of the carrier frequency with the difference between the alternating offsets for each one of the remote radio head devices.

The frequency manipulation scheme may comprise a different frequency hopping scheme for each one of the remote radio head devices.

The means for providing a proximity indication may comprise means for providing an indication of proximity of the wireless device to a plurality of remote radio head devices by considering contributions from of a plurality of manipulation schemes to the uplink signal.

The network node may further comprise means for providing a velocity indication, indicating a velocity of the wireless device based on a frequency offset of the uplink signal compared to the manipulation scheme for the radio head device whose frequency manipulation scheme best matches the uplink signal.

The manipulation scheme may comprise different frequency manipulation for different diversity paths for each remote radio head device.

The network node may further comprise means for configuring each one of the plurality of remote radio head devices with a different manipulation scheme.

The network node may further comprise means for determining a position of the wireless device based on the proximity indication.

According to a fourth aspect, it is presented a computer program for a network node to assist the determining of a position of a wireless device, the network node being connectable to a plurality of remote radio head devices via a combiner. The computer program comprises computer program code which, when run on the network node causes the network node to: receive an uplink signal via the combine; compare a carrier frequency of the uplink signal with a set of manipulation scheme for a carrier frequency of uplink signals, wherein the manipulation schemes are different for at least some of the plurality of remote radio head devices; and provide a proximity indication that the position of the wireless device to be in the vicinity of a remote radio head device the frequency manipulation scheme of which best matches the uplink signal.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, ID step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
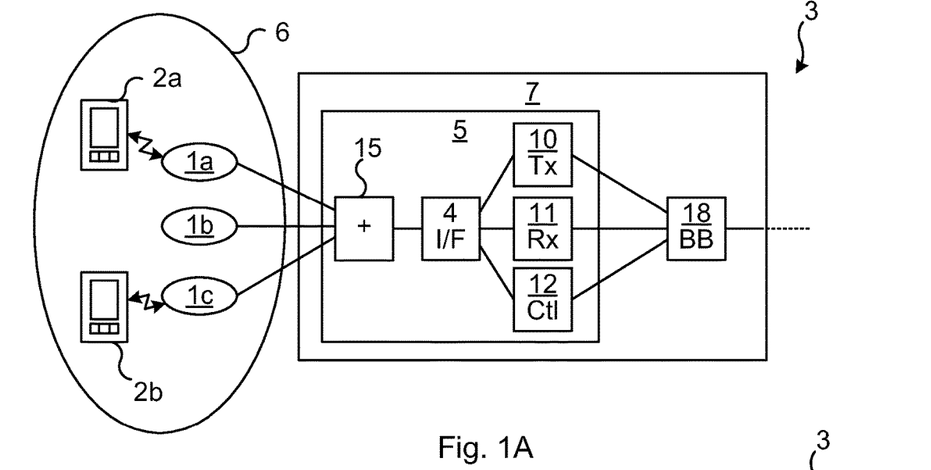
FIGS. 1A-C are schematic architecture diagrams illustrating environments where embodiments presented herein can be applied.
Figure 1B:
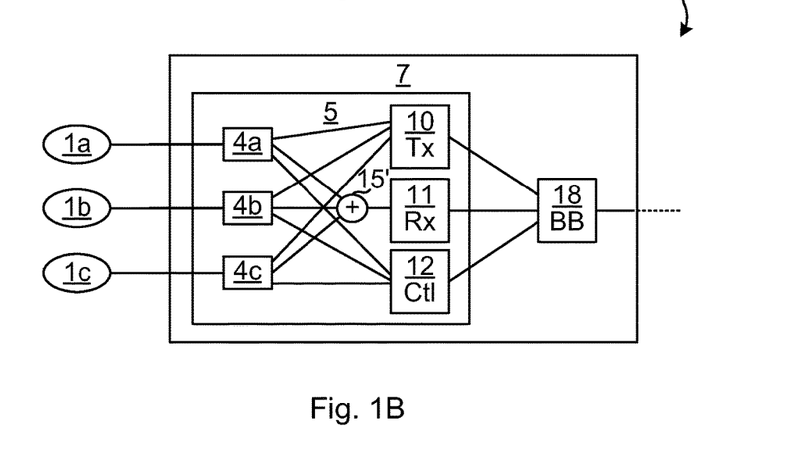
Figure 1C:
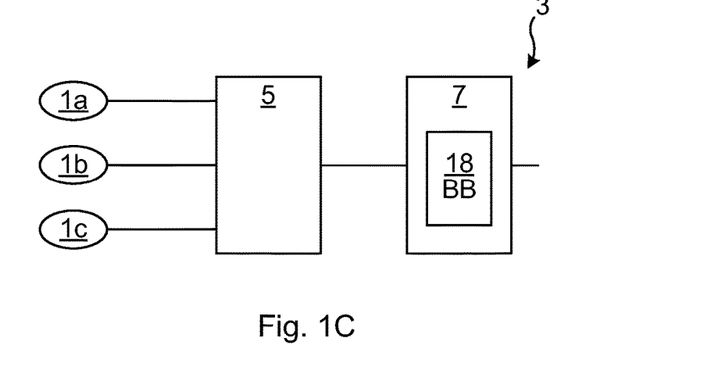

FIGS. 1A-C are schematic architecture diagrams illustrating a wireless communication networks 3 being environments where embodiments presented herein can be applied. Considering first FIG. 1A, the wireless communication network 3 comprises a number of remote radio head devices 1a-c for installation in locations where traditional deployment with antennas being co-located with the radio base stations is not ideal. For example, the wireless communication network 3 can be installed indoors, such as in an office, shopping centre, train station or airport.

It is to be noted that, while the embodiments presented herein are described as implemented using LTE (Long Term Evolution), any applicable communication standard may be used, such as any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an intermediate radio unit (IRU) 5, also known as indoor radio unit when deployed indoors. The IRU 5 is in turn connected to, and is a link for, a number (in this example three) remote radio head devices 1a-c via respective cables. In this way, the radio base station 7 is a link for uplink and downlink communication for the remote radio head devices connected to the IRU.

The remote radio head devices 1a-c connected to the IRU 5 are part of a single cell 6 and thus share a cell identifier. Antennas do not need to be included in this embodiment of the radio base station 7 or the IRU 5, as the remote radio head devices 1a-c provide the antennas for the wireless link to one or more wireless devices 2a-b. The wireless link provided by the remote radio head devices 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today is commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 5 and the remote radio head devices 1a-c.

For uplink communication, the remote radio head devices 1a-c downconvert a received (uplink) signal to IF and send it over its cable to the IRU 5. In this embodiment, the received IF signals are combined in a combiner 15 and fed to an interface circuitry 4. The interface circuitry 4 extracts the received IF signal from the interface and forwards it to the RX (reception) back-end 11. In one embodiment, the RX backend 11 comprises an analogue to digital (A/D) converter which samples the signal on IF and converts to a digital signal. In another embodiment, the RX back-end 11 first downconverts the received signals from IF to an analogue BB (baseband) signal which is further filtered and converter to a digital signal in an analogue to digital converter. The RX back-end 11 sends the combined received signals in digital form to the baseband module 18 for further processing such as demodulation, decoding, etc. as known in the art per se.

Optionally, the remote radio head devices 1*a*-*c* are also powered over the respective cables.

For downlink communication, the process works in reverse to the uplink. Hence, the baseband module 18 sends a digital BB signal for transmission to a TX (transmission) back-end 10 of the IRU 5. In one embodiment, the TX back-end 10 converts the digital BB signal to an analogue signal in IF directly in a digital to analogue (D/A) converter. In another embodiment, the TX back-end 10 pulse first shapes the digital BB signal to an analogue transmission signal and upconverts the transmission signal to IF in the analogue domain. The transmission signal in IF is then inserted onto the interface by the interface circuitry 4, and provided to the combiner 15 which also functions as a splitter, providing the same transmission signal in IF to all connected remote radio head devices 1*a*-*c* over the respective cables. The remote radio head devices 1*a*-*c* then upconvert the IF signal to RF and transmit the RF signal over the air to the wireless devices 2*a*-*b*.

It is to be noted that the processing of uplink and downlink signals in the IRU and the remote radio head devices 1*a*-*c* do not need to occur in the digital domain and can be (but do not need to be) performed completely in the analogue domain.

The remote radio head devices 1*a*-*c* convert from IF to RF for downlink transmission and from RF to IF for uplink reception. Conversely, the IRU converts from digital BB to IF for downlink transmission and from IF to digital BB for uplink reception.

By using IF over the cables instead of RF, cheaper, widely deployed electrical cables can be used, such as Ethernet LAN cabling. In this way, existing indoor cabling can many times be reused during installation, which significantly saves cost and installation time.

Moreover, there is a control link between a processor 12 in the IRU 5 and each remote radio head device 1*a*-*c*. This control link can be used e.g. to set the RF frequency used for downconversion and upconversion in the remote radio head devices 1*a*-*c*.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

It is to be noted that, although FIG. 1A shows the baseband module 18 connected to one IRU 5, each baseband module 18 can be connected to several IRUs. Each IRU may have its own cell or several IRUs may share a single cell.

It is to be noted that while the embodiment of FIG. 1A shows three remote radio head devices 1*a*-*c*, there may be fewer or more remote radio head devices connected to each IRU 5.

The embodiment shown in FIG. 1B is similar to the embodiment of FIG. 1A, and only differences to the embodiment of FIG. 1A will be described. In this embodiment, there are several instances of interface circuitry 4*a*-*c*, one for each remote radio head device. Transmission signals are sent in IF from the transmission back-end 10 to each one of the instances of interface circuitry 4*a*-*c*, either directly or via a splitter (not shown). Analogously, control signals are sent between the processor 12 and each one of the interface circuitry 4*a*-*c*, either directly or via a splitter (not shown). Received signals are sent in IF from the respective interface circuitry 4*a*-*c* to a combiner 15' which may here be a pure combiner without splitting functionality.

Furthermore, in this embodiment, different intermediate frequencies may be used on the different interfaces to best adapt to each interface interference and transmission characteristics. Thus, the TX back-end 10 may send the transmission signal using different IF frequencies to the different instances of interface circuitry 4*a*-*c*, and the RX back-end 11 downconverts from different IF frequencies for the different instances of interface circuitry 4*a*-*c*.

FIG. 1C is a schematic architecture diagram illustrating an alternative embodiment in terms of IRU and radio base station. Here, the IRU 5 is separate, but connected to, the radio base station 7. The IRU 5 itself can be implemented e.g. as shown in FIG. 1A or FIG. 1B.

Figure 2:
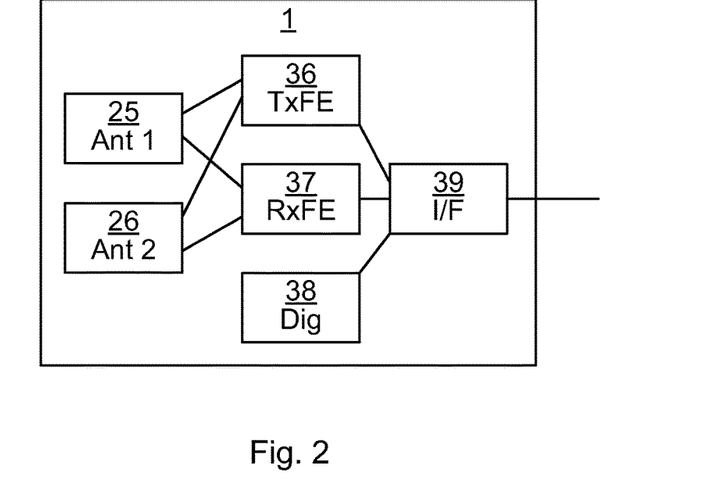
FIG. 2 is a schematic architecture diagram illustrating components of an embodiment of a remote radio head device of FIGS. 1A-C.

FIG. 2 is a schematic architecture diagram illustrating components of an embodiment of a remote radio head device of FIGS. 1-C, here represented by a single remote radio head device 1. The remote radio head device comprises an interface circuitry 39, a transmission front-end 36, a reception front-end 37, a digital unit 38, a first antenna device 25 and a second antenna device 26. It is to be noted that there may be more than two antennas, such as four, six, eight, etc. Furthermore, there may also be only one antenna, if MIMO (Multiple Input Multiple Output) is not employed.

In line with what is explained above, the RX Front End 37 downconverts received signals in RF to IF for transfer over the cable to the IRU 5. Moreover, the TX Front End 36 upconverts transmission signals from IF, as received over the cable from the IRU 5 to RF for transmission to wireless devices.

The first antenna device 25 and second antenna device 26 may be provided with separate streams for MIMO transmission and/or reception. Hence, e.g. for transmissions, the baseband module can provide a first MIMO stream for transmission on the first antenna device 25 and a second MIMO stream for transmission on the second antenna device 26. Each one of the first and second antenna devices 25, 26 may comprise one or more antenna elements. Particularly, each antenna device 25, 26 can comprise one or more antenna elements in a first polarisation and one or more antenna elements in a second polarisation to achieve an additional dimension of orthogonality. The two polarisations may be controlled separately. The antenna devices 25, 26 may also comprise appropriate filters to filter out unwanted signals.

It is to be noted that while the remote radio head device 1 is here shown comprising two antenna devices, there may be more antenna devices, e.g. four, eight, sixteen, etc.

The interface circuitry 39 inserts and extracts (multiplexes and demultiplexes) the transmission IF signal, the received IF signal and the control signal onto/from the cable. The interface circuitry 39 may use different frequency bands for uplink signals, downlink signals and control signals to thereby multiplex all of these on a single cable.

A digital unit 38 communicates with the processor 12 of the IRU. For example, the digital unit 38 may be used to receive commands from the processor 12 to alter frequencies used by the TX Front End 36 and RX Front End 37 for upconversion and/or downconversion. The digital unit 38 can be implemented using software instructions such as a computer program executed by a processor and/or using only hardware, such as application specific integrated circuits, field programmable gate arrays, discrete logical components, etc.

Optionally, the remote radio head device is connected to the radio base station via digital transmissions (not shown). In such a case, the remote radio head device performs analogue to digital conversion, and vice versa, as well as downconversion/upconversion of the analogue signals from/to RF for reception and transmission from/to the wireless devices. The digital signal between IRU and radio head may be CPRI signal. In this case, the radio head performs the conversion between CPRI signal and RF signal.

Figure 3:
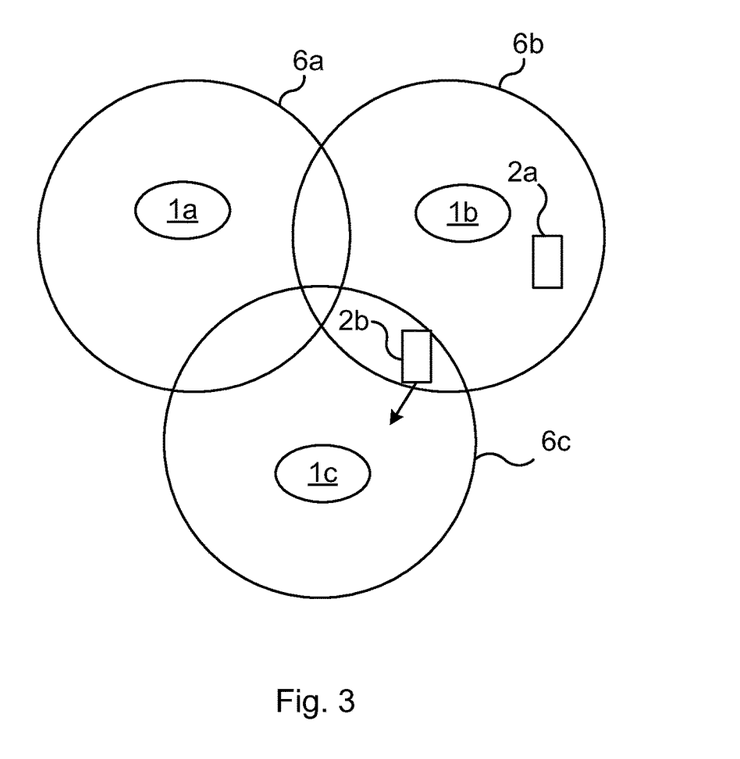
FIG. 3 is a schematic topological diagram illustrating cell coverage of the three remote radio head devices of FIGS. 1A-C according to one embodiment.

FIG. 3 is a schematic topological diagram illustrating cell coverage of the three remote radio head devices 1a-c of FIGS. 1A-C according to one embodiment. The first radio head device is provides coverage in a first coverage area 6a. The second radio head device 1b provides coverage in a second coverage area 6b. The third radio head device is provides coverage in a third coverage area 6c. There is here some overlap between the coverage areas.

A first wireless device 2a is located in the second coverage area 6b. The first wireless device is essentially stationary.

A second wireless device 2b is located in the third coverage area 6c. The second wireless device is moving, essentially in a direction from the second remote radio head device 1b towards the third remote radio head device 1c.

Figure 4A:
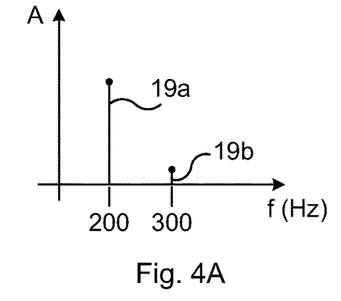
FIGS. 4A-B are schematic graphs illustrating the use of frequency components to indicate position and velocity of a wireless device of FIG. 3 according to one embodiment.
Figure 4B:
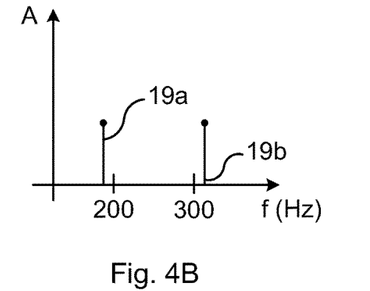

FIGS. 4A-B are schematic graphs illustrating the use of frequency components to indicate position and velocity of a wireless device of FIG. 3 according to one embodiment. The horizontal axis represents a frequency offset in Hertz from an expected carrier frequency for an uplink signal. The vertical axis represents a magnitude of any frequency components of the uplink signal after combination (i.e. after the combiner 15, 15' of FIG. 1A or FIG. 1B). The graphs of FIGS. 4A-B will now be explained with additional reference to FIG. 3.

All remote radio head device 1a-c apply a frequency manipulation scheme on any received uplink signal prior to forwarding the signals to a central node in the network. As explained further below, this assists in determining positions of wireless devices. In this example, the manipulation schemes in the remote radio head devices are different fixed frequency offsets, achieved in the reception front-end 37 where a frequency shift is applied anyway. The fixed frequency offset then implies that a slightly different frequency is used for the downconversion of the received RF signal to IF. For the first remote radio head device 1a, the fixed frequency offset is 100 Hz, for the second remote radio head device 1b the fixed frequency offset is 200 Hz and for the third remote radio head device 1c, the fixed frequency offset is 300 Hz.

In FIG. 4A, components of the uplink signal are shown for the first wireless device 2a.

There is here a relatively large first frequency component 19a at 200 Hz and a relatively small second frequency component 19b at 300 Hz, reflecting the position of the first wireless device 2a close to the second remote radio head device 1b and far away from the third remote radio head device 1c.

In FIG. 4B, components of the uplink signal are shown for the second wireless device 2b.

There is here a first frequency component 19a slightly below 200 Hz and a second frequency component 19b slightly above 300 Hz. The magnitude of the two frequency components 19a-b are about the same and both significant, reflecting the position of the second wireless device 2b in between the second remote radio head device 1b and the third remote radio head device 1c. Moreover, the downshift of the first frequency component 19a relative to 200 Hz indicates a movement away from the second remote radio head device 1b and the upshift of the second frequency component 19b relative to 300 Hz indicates a movement towards from the third remote radio head device 1b. As explained below, this can be used to assist in determination of velocity of the second wireless device 2b.

Figure 5A:
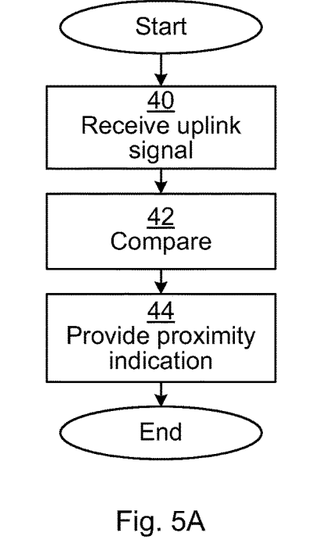
FIGS. 5A-B are flow charts illustrating embodiments of methods performed in a network node of FIG. 1 for assisting the determining of a position of a wireless device.
Figure 5B:
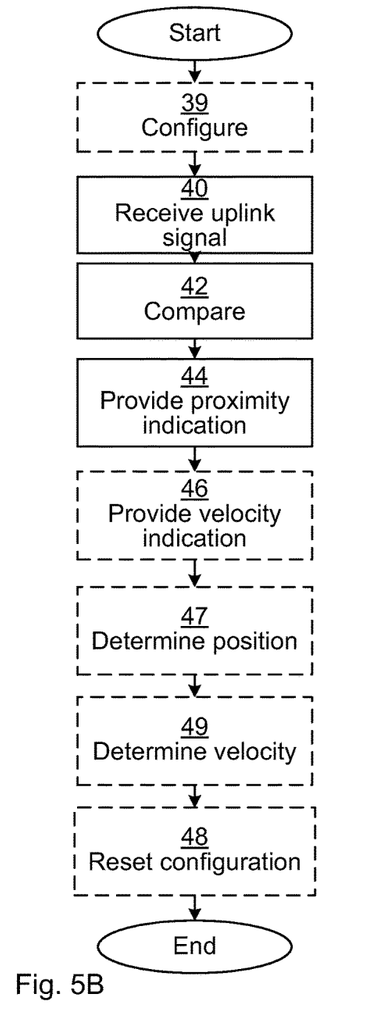

FIGS. 5A-B are flow charts illustrating methods performed in a network node of FIG. 1 for assisting the determining of a position of a wireless device. The network node can be the radio base station 7 or the IRU 5 of FIGS. 1A-C. In any case, the network node is connected to a plurality of remote radio head devices as described above. The method can e.g. be started when a request for a position of a specific wireless device is received by the network node. The method can be performed in parallel for several wireless devices if needed.

In a receive uplink signal step 40, an uplink signal is received via the combiner. The uplink signals is thus a combination of uplink signals received by a plurality of remote radio head devices connected to the network node via the combiner.

In a compare step 42, the carrier frequency of the uplink signal is compared with a set of manipulation scheme for a carrier frequency of uplink signals, wherein the manipulation schemes are different for at least some of the plurality of remote radio head devices.

It is to be noted that the differentiation occurs between remote radio head devices having different manipulation schemes. Hence, there could be two (or more remote radio head devices) sharing a single manipulation scheme. This is particularly useful if the remote radio head devices are closer to each other than the desired granularity of positioning. In this way, the number of different manipulation schemes that are required is reduced.

In one embodiment, the manipulation schemes are different for each one of the plurality of remote radio head devices. In this way, a position can be determined to be in the proximity of a specific remote radio head device, enabling an increased accuracy of positioning.

In one embodiment, the manipulation schemes comprise a different fixed frequency offset for each one of the remote radio head devices.

With typical indoor velocities peaking somewhere around 11 m/s (corresponds to about 40 km/h), the wireless device introduces a maximum frequency offset due to Doppler shift of around ±150 Hz. Extreme frequency offset scenarios such as high speed train cases with speeds at 350 km/h mentioned, pushing frequency offset at 1.5 kHz or more, are assumed not to be applicable for indoor radio systems.

The frequency inaccuracy in the eNodeB in LTE is specified to be less than 0.05 ppm which corresponds to ±100 Hz at a carrier frequency of 2 GHz. The local oscillator of the wireless device in LTE is specified in 3GPP 250.101 version 12.3.0 to have a frequency inaccuracy of less than 100 ppb (parts per billion) which corresponds to ±200 Hz at a carrier frequency of 2 GHz. The accuracy of practical wireless devices in LTE is typically 10 ppb, which corresponds to ±20 Hz at the 2 GHz band.

To distinguish the fixed frequency offset of the manipulation schemes from the frequency offset introduced by the movement of the wireless device and the local oscillator inaccuracy, the offset frequency offset is selected to be large enough to be detectable, but small enough not to significantly deteriorate signal quality (SNR) and Doppler shift estimation reliability.

For OFDM (Orthogonal frequency-division multiplexing) based systems such as LTE with 15 kHz sub-carrier spacing, a frequency offset smaller than 750 Hz (5% of the sub-carrier spacing) keeps the SNR above 20 dB, which keeps signal quality at an acceptable level. Hence, in one embodiment, any frequency shifts of the manipulation is kept within +−750 Hz of the carrier frequency. For WCDMA, a Doppler spread of 1000 Hz is tolerable.

One example of how to configure frequency offsets for eight different remote radio heads could be to use a set of the following fixed frequency offsets: +200 Hz, +300 Hz, +400 Hz, +500 Hz and −200 Hz, −300 Hz, −400 Hz, and −500 Hz. With higher accuracy in the frequency offset estimation, more remote radio head devices can be provided within −500 Hz and +500 Hz.

In one embodiment, the manipulation schemes comprise a different modulation using frequency shift keying for each one of the remote radio head devices. By varying the frequency shift in time, it is possible to distinguish between more remote radio head devices within a given frequency range. Also varying frequency shifts in time can be used to mitigate the impact of the clock inaccuracies in the wireless device.

In one embodiment, the manipulation schemes can comprise different magnitudes of alternating frequency offsets for each one of the remote radio head devices, e.g. +/−200 Hz for a first remote radio head device and +/−300 Hz for a second remote radio head device. The comparing then comprises comparing a difference between alternating frequency offsets over time of the carrier frequency with the difference between the alternating offsets for each one of the remote radio head devices. For instance, if the difference between the alternating frequency offsets of the carrier frequency is 400 Hz, then the uplink signal matches the first remote radio head device, while if the difference between the alternating frequency offsets of the carrier frequency is 600 Hz, then the uplink signal matches the second remote radio head device. By this differential processing over time, any clock inaccuracies in the remote radio head devices are compensated for. Even effects from Doppler shifts from movement can be reduced or even eliminated using this embodiment.

In one embodiment, the frequency manipulation scheme comprises a different frequency hopping scheme for each one of the remote radio head devices. The hopping sequences applied to remote radio heads should be orthogonal.

In one embodiment, the manipulation scheme comprises different frequency manipulation for different diversity paths for each remote radio head device. Diversity paths are e.g. different MIMO (Multiple Input Multiple Output) streams. For example, a frequency shift of +100 Hz may be applied to uplink signals on a first diversity path for a first remote radio head device and a frequency shift of +100 Hz may be applied to uplink signals on a second diversity path for a second remote radio head device. Even though the frequency shifts are identical, since these are applied to different diversity paths, these are distinguishable from each other. This increases the ability to distinguish between remote radio head devices within a certain frequency range.

In a provide proximity indication step 44, a proximity indication is provided, where the proximity indication indicates that the position of the wireless device is in the vicinity of a remote radio head device the frequency manipulation scheme of which best matches the uplink signal. The proximity indication is provided to a positioning node which uses the proximity indication to determine the position of the wireless device. The positioning node can be the network node or it can be a separate node. The positioning node then determines the position of the wireless device, e.g. by looking up the position of the indicated remote radio head device in a database mapping remote radio head devices to positions, e.g. in the form of latitude/longitude coordinated, optionally with an elevation value.

Looking at the first wireless device 2a in FIG. 3, the proximity indication would then be an indication of the second remote radio head device 1b.

In one embodiment, this comprises providing an indication of proximity of the wireless device to a plurality of remote radio head devices by considering contributions from of a plurality of manipulation schemes to the uplink signal. For example, the proximity indication can comprise an indication of magnitude (see e.g. 19a and 19b of FIGS. 4A-B) associated with each one of a plurality of remote radio head devices.

Looking at the second wireless device 2b in FIG. 3, the proximity indication could then include a magnitude indication of the first, second and third remote radio head devices 1a-c. This allows, e.g. by using triangulation, the position of the wireless device to be determined with even greater accuracy.

FIG. 5B is a flow chart illustrating a method similar to the method illustrated in FIG. 5A. Only new steps or steps which are modified compared to the method illustrated in FIG. 5A will be described below.

In an optional configure step 39, each one of the plurality of remote radio head devices connected to the network node are configured with a different manipulation scheme, in accordance with any of the manipulation schemes described above. In this way, the frequency manipulation can be turned on dynamically when a position is to be determined, whereby the frequency manipulation does not need to be applied when position determination is not active.

In an optional provide velocity indication step 46, a velocity indication is provided. The velocity indication indicates a velocity of the wireless device based on a frequency offset of the uplink signal compared to the manipulation scheme for the radio head device whose frequency manipulation scheme best matches the uplink signal, as described with reference to FIG. 4B above.

The velocity indication can be calculated by considering the measured frequency offset FO relative the introduced frequency offset $FO_k$ of the remote radio head device k. Thereby, the relative velocity $v_k$ between the remote radio head k and the wireless device can be estimated using the relation between frequency offset $(FO-FO_k)$ and the wavelength $\lambda$ of the carrier frequency according to formula (1):

$$v_k = (FO - FO_k) * \lambda \tag{1}$$

Furthermore, when multiple frequency offsets can be distinguished, then multiple relative velocities can be estimated. The multiple relative velocities can then be accumulated (using vector addition of vectors determined using the position of the wireless device and the position of each remote radio head device) to yield an estimate of the absolute velocity of the wireless device.

In one embodiment, a time series of parameter estimates can be considered when estimating the position of the wireless device. The relative velocity may then be considered to assess how the wireless device can be assumed to have travelled from one time instant to another. Also, velocity components with regard to multiple remote radio head devices can be utilized. In addition, a motion model can be considered to model the wireless device mobility pattern. One common example of such a linear system due to mobility of an object is a model based on random acceleration. This means that the acceleration in the x and y direction is not correlated between time steps and has a zero-mean Gaussian noise with variance $\sigma_a^2$. The state vector $x_t$ is given by:

$$x_t = [p_x, p_y, v_x, v_y]^T \quad (2)$$

where $p_x$ represents the position in an x direction, $p_y$ represents the position in a y direction, $v_x$ represents the velocity in the x direction and $v_y$ represents the velocity in the y direction. The $A_t$ and $B_t$ transformation matrices are given by:

$$A_t = \begin{pmatrix} 1 & 0 & T_s & 0 \\ 0 & 1 & 0 & T_s \\ 0 & 0 & 1 & 0 \\ 0 & 0 & 0 & 1 \end{pmatrix}, \quad (3)$$

$$B_t = \begin{pmatrix} T_s^2 & 0 \\ 0 & T_s^2 \\ T_s & 0 \\ 0 & T_s \end{pmatrix},$$

where $T_s$ represents the sample time.

Moreover, the model also includes measurement noise assumptions, such that the measurement errors are uncorrelated between time steps, with a zero-mean Gaussian noise with covariance matrix $R_t$.

The estimated parameters y can be seen as nonlinear functions of the true position and velocity y=h(x), subject to measurement errors or uncertainties described by a noise vector e. Examples of estimated parameters include position estimates (y=p) and velocity estimates (y=v).

The model can be summarized as $$x_{t+1} = A_t x_t + B_t v_t \quad (4)$$

$$y_t = h(x_t) + e_t \quad (5)$$

$$\text{Var}\{v_t\} = Q_t = \begin{pmatrix} \sigma_a^2 & 0 \\ 0 & \sigma_a^2 \end{pmatrix} \quad (6)$$

$$\text{Var}\{e_t\} = R_t \quad (7)$$

Commonly, the measurement equation is nonlinear in the states ($h(x_t)$). This can be handled by estimating a linear model locally around the current state estimate. By partially differentiating with respect to each state, and enter the current state estimate, a linear measurement equation is achieved:

$$x_{t+1} = A_t x_t + B_t v_t \quad (8)$$

$$y_t = C_t x_t + e_t \quad (9)$$

$$C_t = \frac{\partial h}{\partial x}\bigg|_{x=\hat{x}_{t|t-1}} \quad (10)$$

$$\text{Var}\{v_t\} = Q_t = \begin{pmatrix} \sigma_a^2 & 0 \\ 0 & \sigma_a^2 \end{pmatrix} \quad (11)$$

$$\text{Var}\{e_t\} = R_t \quad (12)$$

The Kalman filter can be seen as a filter in two phases, first a time update and then a measurement update Time Update $$\hat{x}_{t+1|t} = A_t \hat{x}_{t|t} \quad (13)$$

$$P_{t+1|t} = A_t P_{t|t} A_t^T + Q_t \quad (14)$$

Measurement Update:

$$\tilde{y}_t = y_t - C_t \hat{x}_{t|t-1} \quad (15)$$

$$S_t = C_t P_{t|t-1} C_t^T + R_t \quad (16)$$

$$K_t = P_{t|t-1} C_{t-1} C_t^T S_t^{-1} \quad (17)$$

$$\hat{x}_{t|t} = \hat{x}_{t|t-1} + K_t \tilde{y}_t \quad (18)$$

$$P_{t|t} = (I - K_t C_t) P_{t|t-1} \quad (19)$$

Starting from initial assumptions $\hat{x}_{0|0}$, and $P_{0|0}$. The intermediate variables S, K and P of the Kalman filter can be seen as by-products, but for example $P_{t|t}$ corresponds to the covariance of the estimates. The initial position assumption (first two elements of $\hat{x}_{0|0}$) could be based on less accurate methods such as the location and antenna direction of the serving cell, maybe the center of gravity of the serving cell, and assumption about the velocity (last two elements of $\hat{x}_{0|0}$) for example not being mobile meaning a zero velocity. The initial covariance $P_{0|0}$ could be set with respect to those crude estimates, for example reflecting the cell radius as well as how likely that the mobile is stationary.

In an optional determine position step 47, the position of the wireless device is determined based on the proximity indication. If this step is not performed in the network node, it can be performed in another node.

In an optional determine velocity step 49, the velocity of the wireless device is determined based on the velocity indication, when present. If this step is not performed in the network node, it can be performed in another node.

In an optional reset configuration step 48, any previously configured manipulation scheme (in the configure step 39) can be removed. In this way, the manipulation schemes are only applied when needed.

Figure 6:
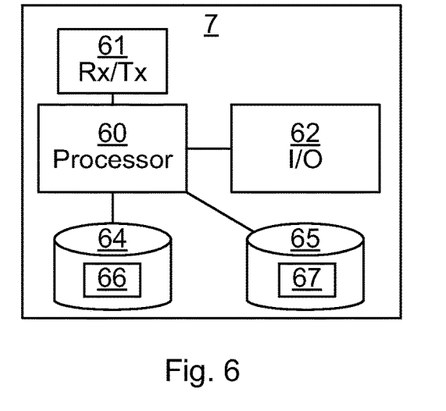
FIG. 6 is a schematic diagram showing some components of an embodiment of the radio base station of FIGS. 1A-C.

FIG. 6 is a schematic diagram showing some components of the radio base station 7 of FIGS. 1A-C. A processor 60 is provided using any combination of one or more of a suitable central processing unit (CPU), multiprocessor, microcontroller, digital signal processor (DSP), application specific integrated circuit (ASIC) etc., capable of executing software instructions 66 stored in a memory 64, which can thus be a computer program product. The processor 60 can be configured to execute the methods described with reference to FIGS. 5A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory. The data memory 65 can e.g. store measurement reports received from wireless devices to be used for positioning of the wireless device as described above.

The radio base station 7 further comprises an I/O interface 62 for communicating with a core network and optionally with other radio base stations.

The radio base station 7 also comprises one or more transceivers 61, comprising analogue and digital components for radio communication with wireless devices within one or more radio cells, e.g. using remote radio head devices as described above. The processor 60 controls the general operation of the radio base station 7, e.g. by sending control signals to the transceiver 61 and receiving reports from the transceiver 61 of its operation.

Other components of the radio base station 7 are omitted in order not to obscure the concepts presented herein.

Figure 7:
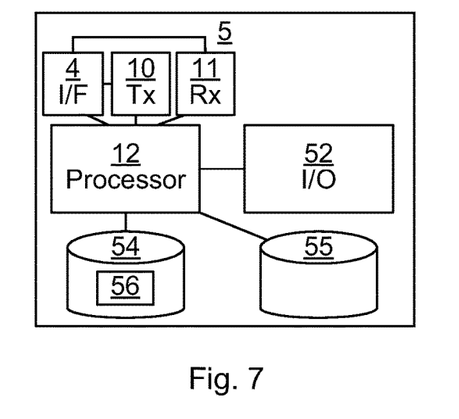
FIG. 7 is a schematic diagram showing some components of an embodiment of any one of the intermediate radio units of FIGS. 1A-C.

FIG. 7 is a schematic diagram showing some components of an embodiment of any one of the intermediate radio units 5 of FIGS. 1A-C, here represented by a single intermediate radio unit 5. A processor 12 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 12 can be configured to execute the methods described with reference to FIGS. 5A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 55 can be any combination of read and write memory (RAM) and read only memory (ROM). The data memory 55 may also comprise persistent storage, which, for example, can be any single one or combination of magnetic memory, optical memory, solid state memory or even remotely mounted memory. The data memory 55 can e.g. store measurement reports received from wireless devices to be used for positioning of the wireless device as described above.

The intermediate radio unit 5 further comprises an interface circuitry 4, a transmitter back-end 10 and receiver back-end 11 which operate as described with reference to FIGS. 1A-C above.

The intermediate radio unit 5 may separate from and connected to a radio base station, or form part of a hosting radio base station. When the intermediate radio unit 5 forms part of a hosting radio base station, some or all of the components of FIG. 7 may also be used for other purposes within the radio base station and may e.g. be the equivalent components shown in FIG. 6.

Other components of the intermediate radio unit 5 are omitted in order not to obscure the concepts presented herein.

Figure 8:
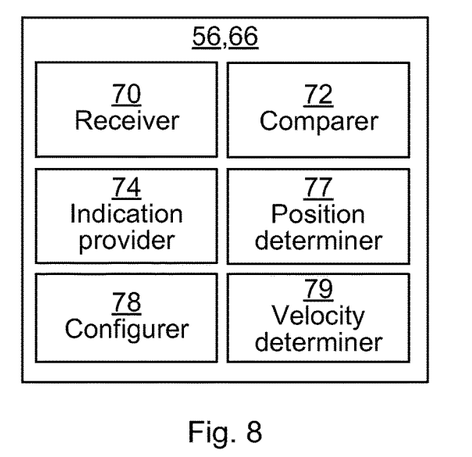
FIG. 8 is a schematic diagram showing functional modules of the software instructions of the radio base station of FIG. 6 and/or the software instructions of the intermediate radio unit of FIG. 7 according to one embodiment.

FIG. 8 is a schematic diagram showing functional modules of the software instructions 66 of the radio base station 7 of FIG. 6 and/or the software instructions 56 of the intermediate radio unit 5 of FIG. 7 according to one embodiment. The modules are implemented using software instructions such as a computer program executing in the network node 1. The modules correspond to the steps in the methods illustrated in FIGS. 5A-B.

A receiver 70 is arranged to receive an uplink signal via the combiner. This module corresponds to the receive uplink signal step 40 of FIGS. 5A-5B.

A comparer 72 is arranged to compare the carrier frequency of the uplink signal with a set of manipulation schemes for a carrier frequency of uplink signals. This module corresponds to the compare step 42 of FIGS. 5A-5B.

An indication provider 74 is arranged to provide a proximity indication that the position of the wireless device is in the vicinity of a remote radio head device for which the frequency manipulation scheme best matches the uplink signal. This module corresponds to the provide proximity indication step of FIGS. 5A-5B. This module also corresponds to the provide velocity indication step 46 of FIG. 5B.

A position determiner 77 is arranged to determine a position of the wireless device based on the proximity indication. This module corresponds to the determine position step 47 of FIG. 5B.

A configurer 78 is arranged to configure each one of the plurality of remote radio head devices with a different manipulation scheme. This module corresponds to the configure step 39 and the reset configuration step 48 of FIG. 5B.

A velocity determiner 79 is arranged to determine a velocity of the wireless device based on the velocity indication. This module corresponds to the determine velocity step 49 of FIG. 5B.

Figure 9:
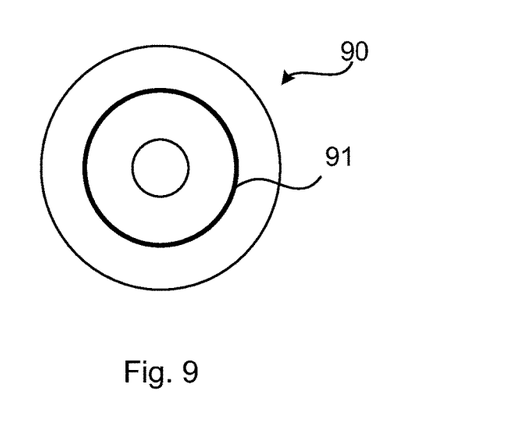
FIG. 9 shows one example of a computer program product comprising computer readable means.

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 6 or the computer program product 56 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

While the embodiments described above relate to frequency manipulation of the different remote radio head device to provide a different identifiable signature of each remote radio head device, signatures of the different remote radio head devices could alternatively be achieved using amplitude modulation, phase modulation or even adding a digital signature (such as a digital fingerprint and/or watermark) to an uplink received signal in the remote radio head device. The digital signature is only possible when the link between the remote radio head devices and the intermediate radio unit is a digital link.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting in determining a position of a wireless device, the method being performed in a network node connected to a plurality of remote radio head devices via a combiner, wherein at least some of the plurality of remote radio head devices utilize a different manipulation scheme, from a set of manipulation schemes, in downconverting an uplink signal from the wireless device, in which a respective different manipulation scheme is utilized to identify a corresponding remote radio head device, the method comprising:
    receiving the uplink signal via the combiner, wherein the combiner combines the uplink signal received via the plurality of remote radio head devices;
    comparing a carrier frequency of the uplink signal with the set of manipulation schemes for a carrier frequency of uplink signals, corresponding to the different manipulation schemes used by the plurality of remote radio head devices to identify characteristics of the uplink signal received and downconverted at separate remote radio head devices; and
    providing a proximity indication that the position of the wireless device is in a vicinity of a particular remote radio head device based on which remote radio head device provides best recovery of the uplink signal and identifying the particular remote radio head device based on the manipulation scheme used to obtain the best recovery of the uplink signal.

2. The method according to claim 1, wherein the manipulation schemes are different for each one of the plurality of remote radio head devices.

3. The method according to claim 1, wherein the manipulation schemes comprise a different fixed frequency offset for each one of the plurality of remote radio head devices.

4. The method according to claim 1, wherein the manipulation schemes comprise a different modulation using frequency shift keying for each one of the plurality of remote radio head devices.

5. The method according to claim 4, wherein the manipulation schemes comprise different magnitudes of alternating frequency offsets for each one of the plurality of remote radio head devices, and the comparing comprises:
    comparing a difference between alternating frequency offsets of the carrier frequency, with the difference between the alternating frequency offsets for each one of the plurality of remote radio head devices.

6. The method according to claim 1, wherein the manipulation schemes comprise a different frequency hopping scheme for each one of the plurality of remote radio head devices.

7. The method according to claim 1, wherein the providing a proximity indication comprises providing an indication of proximity of the wireless device to two or more of the plurality of remote radio head devices by considering contributions from two or more of the manipulation schemes to the uplink signal.

8. The method according to claim 1, further comprising:
    providing a velocity indication, indicating a velocity of the wireless device based on a frequency offset of the uplink signal for the particular remote radio head device.

9. The method according to claim 1, wherein the manipulation schemes comprise different frequency manipulations for different diversity paths for each remote radio head device.

10. The method according to claim 1, further comprising:
    configuring each one of the plurality of remote radio head devices with a different one of the set of manipulation schemes.

11. The method according to claim 1, further comprising:
    determining a position of the wireless device based on the proximity indication.

12. A network node to assist in a determination of a position of a wireless device, the network node being connectable to a plurality of remote radio head devices via a combiner, wherein at least some of the plurality of remote radio head devices utilize a different manipulation scheme, from a set of manipulation schemes, in downconverting an uplink signal from the wireless device, in which a respective different manipulation scheme is utilized to identify a corresponding remote radio head device, the network node comprising:
    a processor; and
    a memory that stores instructions that, when executed by the processor, cause the network node to:
        receive the uplink signal via the combiner, wherein the combiner combines the uplink signal received via the plurality of remote radio head devices;
        compare a carrier frequency of the uplink signal with the set of manipulation schemes for a carrier frequency of uplink signals, corresponding to the different manipulation schemes used by the plurality of remote radio head devices to identify characteristics of the uplink signal received and downconverted at separate remote radio head devices; and
        provide a proximity indication that the position of the wireless device is in a vicinity of a particular remote radio head device based on which remote radio head device provides best recovery of the uplink signal and identifying the particular remote radio head device based on the manipulation scheme used to obtain the best recovery of the uplink signal.

13. The network node according to claim 12, wherein the instructions to compare comprise instructions that, when executed by the processor, cause the network node to consider that the manipulation schemes are different for each one of the plurality of remote radio head devices.

14. The network node according to claim 12, wherein the manipulation schemes comprise a different fixed frequency offset for each one of the plurality of remote radio head devices.

15. The network node according to claim 12, wherein the manipulation schemes comprise a different modulation using frequency shift keying for each one of the plurality of remote radio head devices.

16. The network node according to claim 15, wherein the manipulation schemes comprise different magnitudes of alternating frequency offsets for each one of the plurality of remote radio head devices, and the memory further storing instructions that, when executed by the processor, cause the network node to:
    compare a difference between alternating frequency offsets of the carrier frequency, with the difference between the alternating frequency offsets for each one of the plurality of remote radio head devices.

17. The network node according to claim 12, wherein the manipulation schemes comprise a different frequency hopping scheme for each one of the plurality of remote radio head devices.

18. The network node according to claim 12, wherein the instructions to provide a proximity indication comprise instructions that, when executed by the processor, cause the network node to provide an indication of proximity of the wireless device to two or more of the plurality of remote radio head devices by consideration of contributions from two or more of the manipulation schemes to the uplink signal.

19. The network node according to claim 12, wherein the memory further stores instructions that, when executed by the processor, cause the network node to provide a velocity indication, indicating a velocity of the wireless device based on a frequency offset of the uplink signal for the particular remote radio head device.

20. The network node according to claim 12, wherein the manipulation schemes comprise different frequency manipulations for different diversity paths for each remote radio head device.

21. The network node according to claim 12, wherein the memory further stores instructions that, when executed by the processor, cause the network node to configure each one of the plurality of remote radio head devices with a different one of the set of manipulation schemes.

22. The network node according to claim 12, wherein the memory further stores instructions that, when executed by the processor, cause the network node to determine a position of the wireless device based on the proximity indication.

23. A non-transitory computer-readable storage medium storing instructions to assist in determining a position of a wireless device that communicates with a plurality of remote radio head devices, wherein at least some of the plurality of remote radio head devices utilize a different manipulation scheme, from a set of manipulation schemes, in downconverting an uplink signal from the wireless device, in which a respective different manipulation scheme is utilized to identify a corresponding remote radio head device, the instructions which, when run on a processor cause a network node to:
   receive the uplink signal via a combiner, wherein the network node is connectable to the plurality of remote radio head devices via the combiner,
   compare a carrier frequency of the uplink signal with the set of manipulation schemes for a carrier frequency of uplink signals, corresponding to the different manipulation schemes used by the plurality of remote radio head devices to identify characteristics of the uplink signal received and downconverted at separate remote radio head devices; and
   provide a proximity indication that the position of the wireless device is in a vicinity of a particular remote radio head device based on which remote radio head device provides best recovery of the uplink signal and identifying the particular remote radio head device based on the manipulation scheme used to obtain the best recovery of the uplink signal.

24. The non-transitory computer-readable storage medium of claim 23, wherein the manipulation schemes comprise a different fixed frequency offset for each one of the plurality of remote radio head devices.

25. The non-transitory computer-readable storage medium of claim 23, wherein the manipulation schemes comprise a different modulation using frequency shift keying for each one of the plurality of remote radio head devices.

26. The non-transitory computer-readable storage medium of claim 25, wherein the manipulation schemes comprise different magnitudes of alternating frequency offsets for each one of the plurality of remote radio head devices, the non-transitory computer-readable storage medium further storing instructions that, when executed by the processor, cause the network node to:
   compare a difference between alternating frequency offsets of the carrier frequency, with the difference between the alternating frequency offsets for each one of the plurality of remote radio head devices.

27. The non-transitory computer-readable storage medium of claim 23, wherein the manipulation schemes comprise a different frequency hopping scheme for each one of the plurality of remote radio head devices.

28. The non-transitory computer-readable storage medium of claim 23, wherein the instructions to provide a proximity indication comprise instructions that, when executed by the processor, cause the network node to provide an indication of proximity of the wireless device to two or more of the plurality of remote radio head devices by consideration of contributions from two or more of the manipulation schemes to the uplink signal.

29. The non-transitory computer-readable storage medium of claim further storing instructions that, when executed by the processor, cause the network node to provide a velocity indication, indicating a velocity of the wireless device based on a frequency offset of the uplink signal for the particular remote radio head device.

30. The non-transitory computer-readable storage medium of claim 23, wherein the manipulation schemes comprise different frequency manipulations for different diversity paths for each remote radio head device.

* * * * *